(12) United States Patent
Ganesh et al.

(10) Patent No.: US 9,103,035 B2
(45) Date of Patent: Aug. 11, 2015

(54) EROSION RESISTANT COATING SYSTEMS AND PROCESSES THEREFOR

(71) Applicant: General Electric Company, Schenectady, NY (US)

(72) Inventors: Swami Ganesh, Clifton Park, NY (US); Jeffrey Michael Breznak, Waterford, NY (US)

(73) Assignee: General Electric Company, Schenectady, NY (US)

( * ) Notice: Subject to any disclaimer, the term of this patent is extended or adjusted under 35 U.S.C. 154(b) by 214 days.

(21) Appl. No.: 13/859,809

(22) Filed: Apr. 10, 2013

(65) Prior Publication Data

US 2014/0308493 A1    Oct. 16, 2014

(51) Int. Cl.
| | |
|---|---|
| *C23C 28/00* | (2006.01) |
| *C23C 24/04* | (2006.01) |
| *B23K 26/00* | (2014.01) |
| *C23C 28/02* | (2006.01) |
| *B23K 26/34* | (2014.01) |
| *F01D 5/28* | (2006.01) |
| *C09D 7/12* | (2006.01) |
| *F01D 5/00* | (2006.01) |

(52) U.S. Cl.
CPC ............. *C23C 28/021* (2013.01); *B23K 26/345* (2013.01); *C09D 7/1291* (2013.01); *C23C 24/04* (2013.01); *F01D 5/28* (2013.01); *F01D 5/288* (2013.01); *B23K 2201/001* (2013.01); *B23K 2203/08* (2013.01); *F05D 2220/31* (2013.01); *Y10T 428/2495* (2015.01); *Y10T 428/24975* (2015.01)

(58) Field of Classification Search
CPC .... C23C 28/021; C23C 24/04; B23K 26/345; F01D 5/28
USPC ............................ 427/596, 446; 428/213, 216
See application file for complete search history.

(56) References Cited

U.S. PATENT DOCUMENTS

| | | | |
|---|---|---|---|
| 6,296,723 B1 | 10/2001 | Tsantrizos et al. | |
| 2004/0110021 A1* | 6/2004 | Seth et al. | 428/553 |

(Continued)

FOREIGN PATENT DOCUMENTS

WO    2011036045    3/2011

OTHER PUBLICATIONS

Cockburn et al. "Laser Assisted Cold Spray".Laser Welding and Surface Treatment. Found at www.industrial-lasers.com/articles/print/volume-23/Issue-11/features/technology-report/laser-assisted-cold-spray.html (2008).*

*Primary Examiner* — Dah-Wei D Yuan
*Assistant Examiner* — Jose Hernandez-Diaz
(74) *Attorney, Agent, or Firm* — Ernest G. Cusick; Gary M. Hartman; Michael D. Winter

(57) ABSTRACT

A coating system and processes by which the coating system can be deposited on a surface region of a component to be resistant to erosion, and particularly resistant to erosion caused by high moisture content environments. The coating system includes a diffusion barrier layer, an intermediate layer overlying the diffusion barrier layer, and an outermost layer overlying the intermediate layer. The diffusion barrier layer is capable of inhibiting diffusion of damaging elements therethrough. The intermediate layer is an erosion-resistant material, having a hardness that is greater than the diffusion barrier layer, and being deposited by a near-net-shape laser deposition process. The outermost layer is erosion-resistant material, having a hardness that is greater that the hardness of the intermediate layer. The intermediate layer has a thickness of greater than the diffusion barrier layer and the outermost layer.

9 Claims, 4 Drawing Sheets

(56) References Cited

U.S. PATENT DOCUMENTS

| | | | |
|---|---|---|---|
| 2008/0178994 A1* | 7/2008 | Qi et al. | 156/245 |
| 2009/0314758 A1* | 12/2009 | Ganesh | 219/137 R |
| 2011/0217567 A1* | 9/2011 | Sandberg | 428/639 |
| 2012/0156356 A1* | 6/2012 | Nakamura | 426/590 |
| 2013/0195671 A1* | 8/2013 | El-Wardany et al. | 416/229 R |

* cited by examiner

EROSION RESISTANT COATING SYSTEMS AND PROCESSES THEREFOR

BACKGROUND OF THE INVENTION

The present invention generally relates to coating systems. More particularly, this invention relates to coating systems for erosion protection of components under aggressive erosion conditions, for example, components of turbomachinery including steam turbines used for power generation.

It is generally recognized that the performance of a land-based steam turbine engine is greatly influenced by the design and performance of last stage buckets operating at reduced steam pressures. Ideally, the last stage bucket should efficiently use the expansion of steam down to the turbine exhaust pressure, while minimizing the kinetic energy of the steam flow leaving the last stage. Service requirements of steam turbine buckets can be complex and demanding. Last stage buckets, in particular, are routinely exposed to a variety of severe operating conditions, including the erosive environments caused by high moisture and the carry-over from a boiler in conjunction with the high tip speeds contributing to high impact velocity of the water droplets. Such conditions can lead to serious erosion and corrosion problems with the bucket material, particularly in longer, last stage turbine buckets having vane lengths of 40 inches (about 100 cm) or greater. Thus, for some time, last stage buckets for turbines have been the subject of repeated investigations and development work in an effort to improve their efficiency under harsh operating conditions since even small increases in bucket efficiency and life span can result in significant economic benefits over the life of a steam turbine engine.

Long last stage steam turbine buckets experience higher tensile loadings and thus are subject to stresses which, when combined with an erosive environment, can be very damaging over long periods of use. Steam in the last stages normally is wet, that is, containing a higher amount of saturated steam relative to preceding stages. As a result, water droplet impact erosion of the bucket material often occurs in the last stage. Such erosion reduces the useable service life of the bucket and the efficiency of the steam turbine as a whole.

Previous approaches to solving the above-mentioned problems with longer vane lengths in last stage buckets vary widely, depending on the end use requirements. In some cases, where service demands are less severe, a conventional bucket material may be acceptable. However, in order to increase erosion resistance, a leading edge of the buckets is normally hardened through localized heat treatment (e.g., flame or induction hardening) to provide additional erosion resistance. Alternatively, an erosion resistant shielding material, such as Stellite 6, can be attached to the bucket by brazing, gas tungsten arc welding, or electron beam welding. These prior art physical attachment methods have limitations that include high cost, longer production cycles, and limited erosion resistance under aggressive operating conditions.

Another known method of manufacturing or repairing steam turbine buckets involves machining specially designed grooves at or near the leading edge for moisture removal to reduce the rate of water droplet erosion. However, this method may not offer adequate protection in high moisture or aggressive erosion environment.

The above-mentioned prior art methods may not provide lasting erosion protection under more aggressive erosion conditions expected in next generation turbines, for example, concentrated solar power turbines, that involve higher moisture contents and/or higher water droplet impact velocities than previous turbines. Additionally, these methods entail risks and limitations that would preferably be avoided or minimized, for example, weld cracking, lower hardness of erosion shields, stress corrosion cracking in the heat affected zone, high costs, and long production cycle times.

In view of the above, it can be appreciated that there are certain problems, shortcomings or disadvantages associated with the prior art, and that it would be desirable if systems and processes were available that are capable of promoting long-term resistance of components to erosion, and particularly land-based steam turbine engine components that operate in high moisture environments.

BRIEF DESCRIPTION OF THE INVENTION

The present invention provides a coating system and processes by which the coating system can be deposited to be resistant to erosion, and particularly resistant to erosion caused by high moisture content environments.

According to a first aspect of the invention, a coating system on a surface region of a component includes a diffusion barrier layer, an intermediate layer overlying the diffusion barrier layer, and an outermost layer overlying the intermediate layer. The diffusion barrier layer is capable of inhibiting diffusion of damaging elements therethrough. The intermediate layer is an erosion-resistant material, having a hardness that is greater than the diffusion barrier layer, and is applied by a near-net-shape laser-aided deposition process. The outermost layer is erosion-resistant material having a hardness that is greater that the hardness of the intermediate layer. The intermediate layer has a thickness of greater than the diffusion barrier layer and the outermost layer.

According to a second aspect of the invention, a process of forming a coating system on a component includes depositing a diffusion barrier layer on at least a surface region of the component, depositing an intermediate layer on the diffusion barrier layer, and then depositing an outermost layer on the intermediate layer. The diffusion barrier layer is capable of inhibiting diffusion of damaging elements therethrough. The intermediate layer is an erosion-resistant material, having a hardness that is greater than the diffusion barrier layer, and being deposited by a near-net-shape laser deposition process. The outermost layer is an erosion-resistant material having a hardness that is greater that the hardness of the intermediate layer. The intermediate layer has a thickness greater than the diffusion barrier layer and the outermost layer.

According to a third aspect of the invention, a process of forming a coating system on a component includes depositing a coating layer on a surface region of the component. The coating layer is applied by a near-net-shape laser deposition process to have a tapered thickness along the radial length of the coating system and comprising a plurality of layers, each layer comprising a plurality of rows of individual deposits.

A technical effect of the invention is the ability of the coating system to provide substantial increase in erosion resistance under severe erosion conditions with lower cost, lower production time, lower residual stress and lower part distortion than the prior art methods. In particular, it is believed that, by configuring the coating system to comprise a relatively thick near-net-shape portion tipped with a thinner portion with increased hardness, erosion resistance of the component can be significantly improved relative to the prior art methods.

Other aspects and advantages of this invention will be better appreciated from the following detailed description.

DETAILED DESCRIPTION OF THE INVENTION

The present invention is generally applicable to components that operate within environments characterized by aggressive erosion conditions. Notable examples of such components include high and low pressure turbine vanes (nozzles) and blades (buckets), shrouds, combustor liners, augmentor hardware, and other erosion-prone components of turbine engines, though the invention has application to other components. For convenience, the present invention will be described in reference to a last stage bucket 10 depicted in FIG. 1 and representative of buckets used in land-based steam turbine engines. Current last stage bucket materials and coatings may experience severe erosion under aggressive erosion conditions anticipated in next generation turbines and it is believed that they will not be able to provide long term erosion protection.

In accordance with embodiments of this invention, the bucket 10 comprises a metal-based substrate and optionally one or more metal-based coatings thereon. Notable examples of metal-based substrate materials include iron-base (e.g., stainless steels), nickel-base, and titanium-base alloys. Of particular interest are precipitation hardened steels comprising a high chromium content (that is, 10% Cr or more by weight), a nonlimiting example of which is a martensitic stainless steel commercially available from Crucible Specialty Metals under the name Crucible 450.

Figure 1:
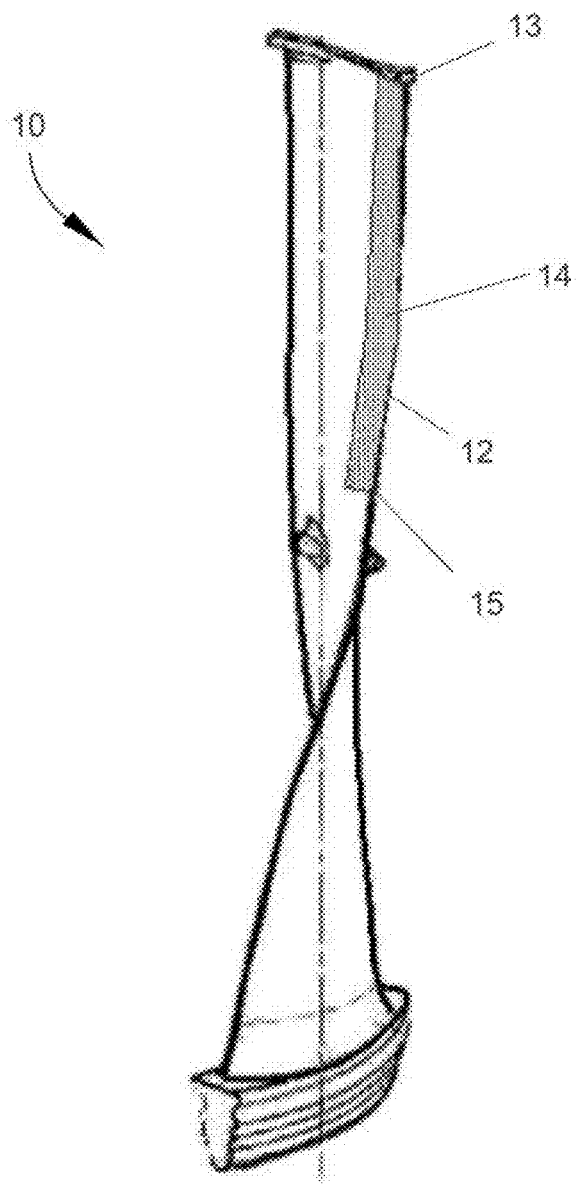
FIG. 1 represents a last stage bucket of a land-based steam turbine engine including a leading edge comprising a coating system in accordance with an aspect of the present invention.

Last stage buckets, such as the bucket 10, are routinely exposed to elements such as moisture which can cause erosion of the bucket substrate material. FIG. 1 represents the bucket 10 as comprising a leading edge 12, which as known in the art may be particularly susceptible to erosion. In order to extend the life span of the bucket 10, the present invention provides a multi-layer erosion resistant coating system 14 represented in FIG. 1 as formed on a portion of the leading edge 12 of the bucket 10.

Figure 2:
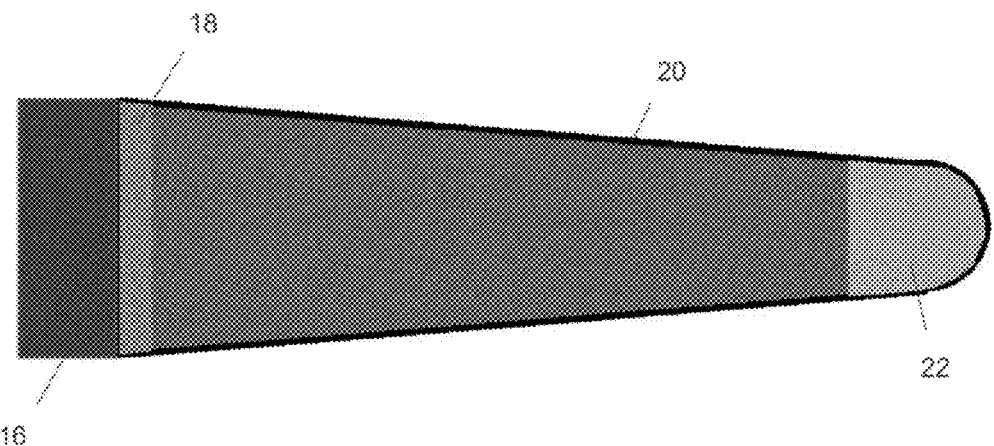
FIG. 2 is a cross-sectional view of the leading edge of the bucket of FIG. 1 schematically representing the coating system of FIG. 1.
Figure 3:
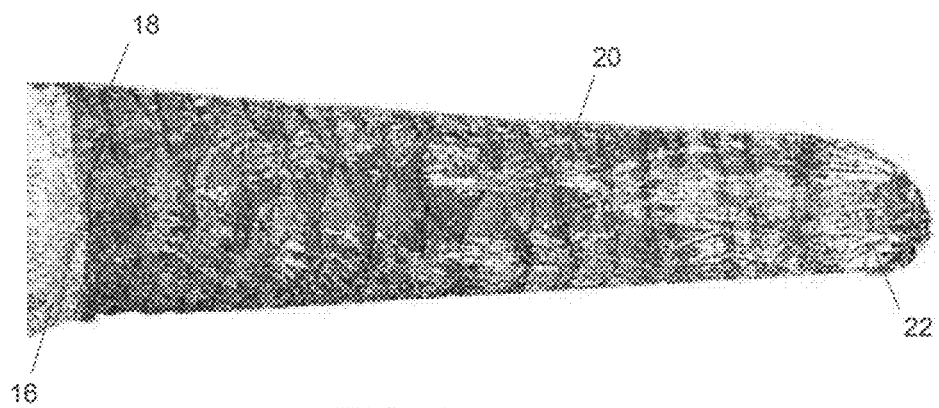
FIG. 3 is a scanned image showing a cross-section view of a coating system deposited in accordance with an aspect of the present invention.

FIG. 2 schematically represents a cross-section of the coating system 14 on the leading edge 12, and FIG. 3 is a scanned image showing a cross-section representative of the coating system 14. Preferred embodiments of the coating system 14 are relatively thick (the thickness being defined as measured from a surface of the substrate 16 to the outermost extent of the coating system 10), for example, up to about 15 mm, compared to erosion coatings known in the art (typically less than about 2.5 mm) to promote improved long-term erosion resistance. However, it is foreseeable that the coating system 14 could be formed to have a total thickness that is greater or less than 15 mm.

In the embodiments of FIGS. 2 and 3, the coating system 14 comprises an optional diffusion barrier layer 18, an intermediate layer 20, and an optional outermost layer 22. The diffusion barrier layer 18 is represented as formed directly on a metal-based substrate 16 at the leading edge 12 of the bucket 10. In erosion-resistant coatings that contain substantial levels of carbon, for example, Stellite 6 (a cobalt-based alloy having a reported composition of, by weight, about 27-32% chromium, about 4-6% tungsten, about 0.9-1.4% carbon, additions of nickel, iron, silicon, manganese and molybdenum, the balance being cobalt), carbon can migrate from the coating system 14 into the substrate 16 during application of the coating system 14 or a subsequent thermal treatment. This migration can cause a carbon depleted zone in the coating system 14 and an intergranular carbide network in a heat affected zone (HAZ) of the substrate 16, which individually and/or in combination can degrade bonding strength and promote cracking at the interface between the coating system 14 and the substrate 16. To reduce the formation of these undesirable regions, the diffusion barrier layer 18 is capable of reducing, and preferably substantially preventing, the diffusion of carbon or other damaging elements from the coating system 14 to the substrate 16 during application of the coating system 14, a post-application heat treatment, and/or during operation of the bucket 10.

The diffusion barrier layer 18 may comprise, and in preferred embodiments consists essentially or entirely of, a nickel-based alloy and is disposed between the substrate 16 and the layer 20 of the coating system 14. A particularly notable but nonlimiting example of a suitable nickel-base alloy is Alloy 625, which is a nickel-base alloy having a nominal composition of, by weight, about 21.5% chromium, about 9.0% molybdenum, about 3.6% niobium, about 2.5% iron, less than 0.1% carbon and small additions of aluminum, titanium, manganese, and silicon, the balance being nickel. Examples of alternate alloys suitable for the diffusion barrier layer 18 include nickel-base alloys Alloy 617 having a nominal composition of, by weight, about 22% chromium, about 12.5% cobalt, about 9% molybdenum, about 1% aluminum, about 3% iron, and small additions of manganese and silicon, the balance being nickel, and HastelloyX having a nominal composition of, by weight, about 22% chromium, about 18.5% iron, about 9.0% molybdenum, and additions of manganese, silicon, cobalt and tungsten, the balance being nickel. The diffusion barrier layer 18 preferably has a thickness of at least about 0.5 mm to avoid carbon migration into the substrate 16, but less than about 1.25 mm to minimize dilution of the composition of the coating system 14 and formation of a soft zone between the substrate 16 and the coating system 14.

The intermediate layer 20 comprises, and in preferred embodiments consists essentially or entirely of, an erosion resistant material such as, but not limited to, cobalt-chromium alloys such as Stellite 6. The intermediate layer 20 has a greater hardness than the diffusion barrier layer 18 of the coating system 14, and preferably, a significantly greater hardness than the diffusion barrier layer 18. In addition, the intermediate layer 20 is preferably deposited using a process capable of forming the layer 20 as a near-net-shape deposit, for example, a laser-aided process. For example, the intermediate layer 20 is preferably deposited so as to have a tapered cross-sectional shape, such as that depicted in FIGS. 2 and 3, to conform to the bucket leading edge geometry. The intermediate layer 20 preferably has a thickness greater than about 7.5 mm in order to promote long-term erosion resistance, but less than about 15 mm to minimize residual stress and distortion effects as well as potential softening of the coating system 14 due to excessive heat build-up.

A thick, near-net-shape, deposit is particularly possible with the use of laser deposition processes or other methods capable of forming the intermediate layer 20 from a plurality of stacked individual layers, each preferably comprising a plurality of rows of individual deposits, for example, as evident from FIG. 3. In addition, precise control of heat input and cooling rate can be achieved with near-net-shape deposition processes using a specialized laser during the formation of the intermediate layer 20. In particular, the laser process preferably enables the temperature of the intermediate layer 20 to be controlled during deposition by allowing previously applied individual layers to cool while the laser heat source is in a different location on the bucket 10. To reduce heat input into previously deposited individual layers of the intermediate layer 20, each individual deposit may be applied by translating a laser beam in the radial direction along the component 10 (for example, into the plane of the page in FIG. 3) rather than being applied by translating the laser beam in one direction and then reversing the direction of the laser beam to return across the previously deposited individual layers in the opposite direction. Additionally, chill blocks (not shown) or other methods known in the art may be used to maintain a uniform cooling rate for each individual deposit of the intermediate layer 20.

The outermost layer 22 of the coating system 14 is formed on the intermediate layer 20 to further improve the hardness and erosion resistance capabilities of the coating system 14. Preferably, the outermost layer 22 is deposited by a cold spraying process capable of forming a deposit that exhibits greater hardness and, therefore, greater erosion resistance, than the intermediate layer 20 deposited by the laser-aided process. Similar to the intermediate layer 20, the outermost layer 22 comprises, and in preferred embodiments consists essentially or entirely of, an erosion resistant material, for example, a cobalt-chromium alloy such as Stellite 6. Application of the cold sprayed outermost layer 22 on the intermediate layer 20 preferably provides significantly increased hardness (for example, up to a 50% increase or more on the Knoop Hardness scale) at the outermost surface of the coating system 14 as compared to the intermediate layer 20, and therefore greater erosion resistance. The increased hardness of the outermost layer 22 is believed to be due to the deformation and cold work imparted on powder particles used in the cold spraying process, as well as an ultrafine microstructure that can be achieved with the use of super fine powders. However, because cold spray coatings are not conducive to a near-net-shape process the outermost layer 22 is preferably limited to a relatively thin thickness on the intermediate layer 20, preferably at least one mm to improve erosion resistance but not greater than about three mm to maintain the near-net-shape of the coating system 14. Additional advantages of cold spraying the outermost layer 22 rather than laser deposition include lower residual stresses and distortion.

Figure 4:
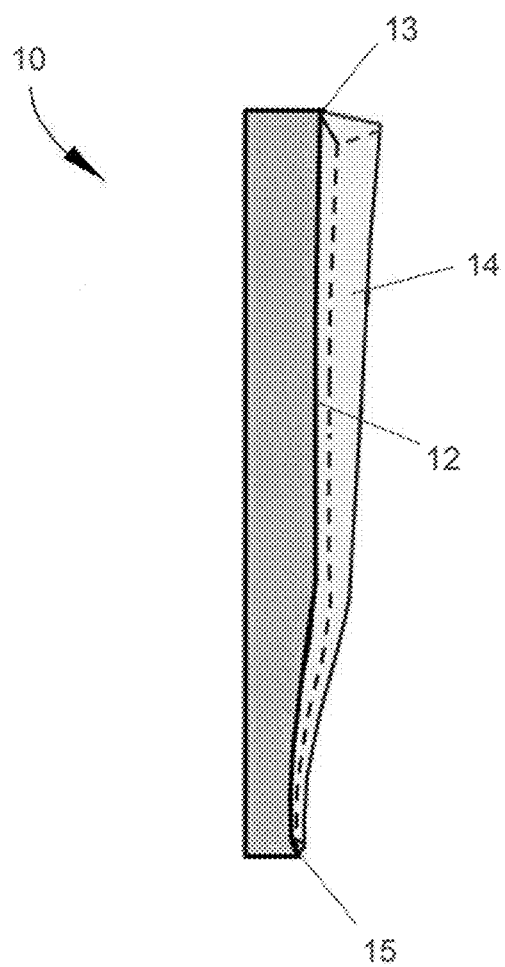
FIG. 4 is a cross-sectional view representing the coating system on a leading edge of a bucket comprising a coating system having a tapered, uniformly sloping thickness in accordance with an aspect of the present invention.

According to an aspect of the invention, the thickness of the coating system 14 may be varied or tapered, as represented in FIG. 4, such that the maximum thickness, for example 13 mm, is at a tip 13 of the bucket 10 where the erosion severity is believed to be maximized and the minimum thickness, for example 1.5 mm, is at a tail end 15 of the coating system 14 towards a base of the bucket 10, for example 450 mm from the tip 13. The thickness of the coating system 14 can be varied with a uniform slope or can be maintained uniform for some distance from the tip 13, for example 120 mm, and then tapered with a uniform slope. Such coating configuration tailors the coating system thickness to match the erosion severity along the leading edge 12 and thereby provides significant benefits that include lower residual stress and distortion and lower coating volume, production time, and cost. Alternatively, the thickness of the coating system 14 may be uniform on the surface of the bucket 10.

After the layers 18, 20, and 22 have been deposited, one or more heat treatments may be performed on the bucket 10. For example, a low temperature aging heat treatment can be performed at temperatures less than about 950 degrees Fahrenheit (about 510 degrees Celsius) on the bucket 10 for about three to six hours to restore the hardness of the heat affected zone. An alternate heat treatment can be a full solution heat treatment at temperatures, for example, from about 1800 to about 1900 degrees Fahrenheit (about 980 to about 1040 degrees Celsius) for about two to four hours, followed by an aging treatment at temperatures, for example, from about 900 to about 950 degrees Fahrenheit (about 480 to about 510 degrees Celsius) for about three to six hours. The full solution heat treatment and aging treatment are believed to minimize the residual stresses in the coating system 14 and the substrate 16 and restore uniform hardness in the substrate 16. Heat treatments are preferably carried out in a vacuum furnace to minimize surface oxidation and post-heat treatment machining. Alternatively, the coating system 14 can be applied without any post-weld heat treatment.

After the completion of the heat treatment, finishing processes may be performed on the coating system 14 and/or the bucket 10. Blending and polishing processes are preferably performed to meet the required dimensions and shape of the coating system 14 on the bucket 10. The bucket 10 may be finished prior to application of the coating system 14 or may be partially or semi-finished and blended and polished along with the coating system 14. Finally, a shot peening process is preferably performed on the coating system 14 and the adjacent substrate 16 to induce compressive stress in near-surface regions of the coating system 14 as well consolidate the outermost layer 22.

Figure 5:
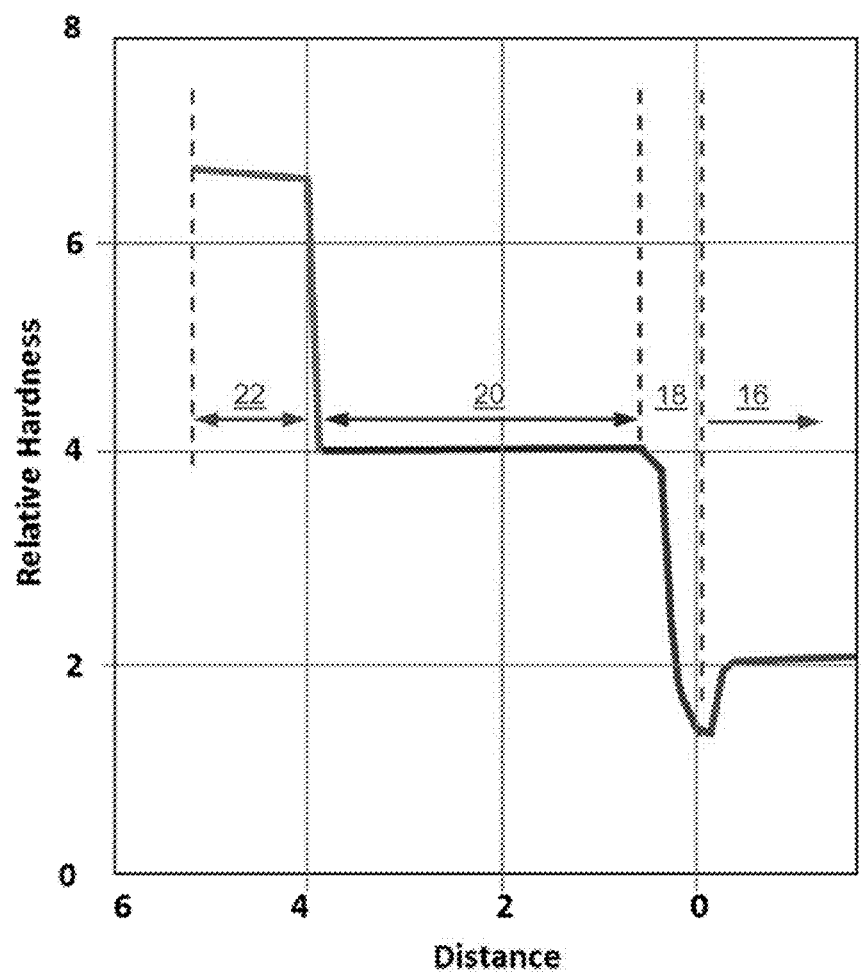
FIG. 5 is a graph representing a hardness profile of coating systems observed during investigations leading to the present invention.

Investigations leading to the present invention include erosion tests, hardness profile tests, tensile and shear tests, and high-cycle fatigue and low-cycle fatigue tests. Significant improvements were observed in desired properties of tested buckets. A hardness profile showing the observed relative hardness of the individual layers of the laser deposited coating system and thickness of the layers 18, 20, and 22 are represented in FIG. 5. The erosion resistance of the coating system was observed to be superior to conventional laser clad coatings and welded wrought erosion shields. Mechanical properties of the coating system were also observed to exceed conventional coatings and operational requirements for erosion-prone components of turbine engines.

While the invention has been described in terms of specific embodiments, it is apparent that other forms could be adopted by one skilled in the art. For example, additional layers could be added to the coating system 14 for specific applications, and materials and processes other than those noted could be used if capable of producing layers having the properties described for the layers 18, 20 and 22 described for the coating system 14. Therefore, the scope of the invention is to be limited only by the following claims.

The invention claimed is:

1. A process of forming a coating system on a component, the process comprising:
   depositing a diffusion barrier layer on at least a surface region of the component, the diffusion barrier layer being capable of inhibiting diffusion of damaging elements therethrough;
   directly depositing an intermediate layer on the diffusion barrier layer, the intermediate layer comprising an erosion-resistant material, having a hardness that is greater than the diffusion barrier layer, and being deposited by a near-net-shape laser deposition process; and
   directly depositing an outermost layer on the intermediate layer, the outermost layer comprising an erosion-resistant material and having a hardness that is greater that the hardness of the intermediate layer;
wherein the intermediate layer has a thickness of greater than the diffusion barrier layer and the outermost layer.

2. The process of claim 1, wherein the intermediate layer is formed by the near-net-shape laser deposition process to have a tapered cross-sectional shape conforming to the geometry of the surface region of the component and comprise a plurality of layers, each layer comprising a plurality of rows of individual deposits.

3. The process of claim 1, wherein the coating system is formed by the near-net-shape laser deposition process to have a tapered thickness along a radial length of the component.

4. The process of claim 1, wherein the outermost layer is formed by a cold spraying.

5. The process of claim 1, wherein the component is an airfoil component of a steam turbine engine and is formed of an alloy chosen from the group consisting of iron-base, nickel-base, and titanium-base alloys.

6. The process of claim 1, further comprising blending and/or polishing an exterior surface of the coating system after depositing the outermost layer.

7. The process of claim 1, further comprising shot peening the coating system and surfaces of the component adjacent to the coating system to induce compressive stress within the coating system.

8. The process of claim 1, further comprising performing a low temperature aging heat treatment on the component after forming the coating system at temperatures of less than about 510 degrees Celsius for three to six hours.

9. The process of claim 1, further comprising performing a high temperature solution heat treatment on the component after forming the coating system at temperatures of about 980 to about 1040 degrees Celsius for two to four hours, followed by an aging treatment at temperatures, of about 480 to about 510 degrees Celsius for three to six hours.

* * * * *